(12) United States Patent
Singh et al.

(10) Patent No.: US 12,445,533 B2
(45) Date of Patent: Oct. 14, 2025

(54) DYNAMIC CACHING BASED ON A USER'S TEMPORAL AND GEOGRAPHICAL LOCATION

(71) Applicant: Bank of America Corporation, Charlotte, NC (US)

(72) Inventors: Shailendra Singh, Thane West (IN); Savitri Sibaram Desulu, Mumbai (IN); Thomas Boffin James, Mumbai (IN); Amrut Gopal Nayak, Mumbai (IN)

(73) Assignee: Bank of America Corporation, Charlotte, NC (US)

( * ) Notice: Subject to any disclaimer, the term of this patent is extended or adjusted under 35 U.S.C. 154(b) by 44 days.

(21) Appl. No.: 18/604,079

(22) Filed: Mar. 13, 2024

(65) Prior Publication Data
US 2025/0294083 A1    Sep. 18, 2025

(51) Int. Cl.
*H04L 67/568* (2022.01)
*H04L 67/52* (2022.01)

(52) U.S. Cl.
CPC .......... *H04L 67/568* (2022.05); *H04L 67/52* (2022.05)

(58) Field of Classification Search
CPC .............................. H04L 67/568; H04L 67/52
See application file for complete search history.

(56) References Cited

U.S. PATENT DOCUMENTS

| | | |
|---|---|---|
| 10,216,646 B2 | 2/2019 | Lin et al. |
| 10,680,889 B2 | 6/2020 | Vasseur et al. |
| 10,901,896 B2 | 1/2021 | Gunnels et al. |
| 10,943,263 B2 | 3/2021 | Sangoi et al. |
| 10,992,549 B2 | 4/2021 | Bathen et al. |
| 11,367,014 B2 | 6/2022 | Vacon et al. |
| 11,455,198 B1 | 9/2022 | Singh |

(Continued)

FOREIGN PATENT DOCUMENTS

| | | |
|---|---|---|
| CN | 1950767 B | 9/2012 |
| CN | 106681250 B | 1/2019 |

(Continued)

OTHER PUBLICATIONS https://www.xanadu.ai/; Quantum Hardware: Quantum computational advantage; 2024 Xanadu.

(Continued)

*Primary Examiner* — Benjamin M Thieu

(57) ABSTRACT

A system for dynamically caching information includes a memory for storing location information and user information and a processor configured to periodically receive geolocation data associated with a first external device and store that geolocation data, along with a time stamp, as location information in the memory. After a predetermined period of time, the processor retrieves from the memory the location information corresponding to the predetermined time period. Machine learning is used to determine the probability of a first action. When the probability is higher than the first predetermined amount, the processor is configured to retrieve information needed to perform a first action and send the retrieved information to a second external device to store the information as cached information. This cached information is then used to perform a first action using the cached information on the second external device.

20 Claims, 3 Drawing Sheets

(56) References Cited

U.S. PATENT DOCUMENTS

| | | |
|---|---|---|
| 11,637,687 B2 | 4/2023 | Smith et al. |
| 11,711,210 B2 | 7/2023 | Syrivelis et al. |
| 2019/0129405 A1 | 5/2019 | Cella et al. |
| 2019/0132350 A1 | 5/2019 | Smith et al. |
| 2019/0378073 A1 | 12/2019 | Lopez et al. |
| 2020/0118031 A1* | 4/2020 | Reese .................... G06N 3/044 |
| 2021/0286923 A1 | 9/2021 | Kristensen et al. |
| 2022/0308902 A1* | 9/2022 | Tormasov ............. G06F 3/0481 |
| 2022/0309367 A1* | 9/2022 | Tormasov ................ G06N 5/04 |
| 2022/0327413 A1 | 10/2022 | Zhang et al. |
| 2023/0040849 A1 | 2/2023 | Shanmugam Sakthivadivel et al. |

FOREIGN PATENT DOCUMENTS

| | | |
|---|---|---|
| CN | 106253487 B | 2/2019 |
| CN | 108447291 B | 8/2020 |
| EP | 3388986 A1 | 10/2018 |
| WO | 2020163559 A1 | 8/2020 |

OTHER PUBLICATIONS

Alvaro Ballon; "Photonic quantum computers;" published May 30, 2022; updated Dec. 31, 2023; https://pennylane.ai/qml/demos/tutorial_photonics.html.

Change Management, "Change Management Needs to Change" by Ron Ashkenas from Harvard Business Review Apr. 16, 2013; https://hbr.org/2013/04/change-management-needs-to-cha.

* cited by examiner

DYNAMIC CACHING BASED ON A USER'S TEMPORAL AND GEOGRAPHICAL LOCATION

TECHNICAL FIELD

The present disclosure relates generally to network communication and, more specifically, to a system and method to perform dynamic caching based on a user's temporal and geographical location.

BACKGROUND

People increasingly want to be able to perform actions at any place and time without waiting long periods for the data required to complete the action to be loaded on a device associated with the action. However, there is no present system for facilitating data to arrive quickly to the device or at all. If the action is essential or critical, a failure to receive needed data promptly or at all may result in an action being unable to be performed, which may have severe consequences. The existing approaches to making data available for performing an action are inefficient, use unnecessary resources, or are unreliable.

SUMMARY

The system and method disclosed in the present application provide a technical solution to the technical problems discussed above by providing the capability to determine potential actions that a user may perform in the near future. The determination may be determined using machine learning, such as but not limited to quantum generative artificial intelligence. The determination uses the user's location and temporal information to determine potential future actions. Once the possible actions are determined, appropriate information may be sent to devices associated with those actions, including edge devices, local devices, point-of-sale devices, and other computer devices. The information is stored on the devices as cached information and retained for a preset amount of time. When and if a user performs or initiates the action, the cached information is used to perform the action.

The disclosed system provides several practical applications, such as predicting what actions a user may wish to perform and caching needed data prior to the action being performed. This allows users to perform actions without delay, even when network or other issues prohibit or slow communication with a necessary backend system. In one embodiment, the system also ensures that caching data only needs to be sent to the devices related to actions a user is most likely to perform while reducing bandwidth and storage needs for caching data for actions a user is less likely to perform. This approach provides for better efficiency and provides a user with a better experience compared to existing approaches.

In one embodiment, the disclosed system dynamically caches information. The system includes a memory for storing location and user information, and the system includes a processor operably coupled to the memory. The processor is configured to periodically receive geolocation data from a first external device and store that geolocation data, along with a time stamp, as location information in the memory. After a predetermined period of time, the processor retrieves from the memory the location information corresponding to the predetermined time period. The processor then uses machine learning to determine the probability of a first action based on the location information. When the probability is higher than the first predetermined amount, the processor is configured to retrieve information needed to perform a first action and send the retrieved information to a second external device to store the information as cached information. This cached information is then used to perform a first action using the cached information.

Certain embodiments of the present disclosure may include some, all, or none of these advantages. These advantages and other features will be more clearly understood from the following drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

System Configured to Cache Information Dynamically, Overview

Figure 1:
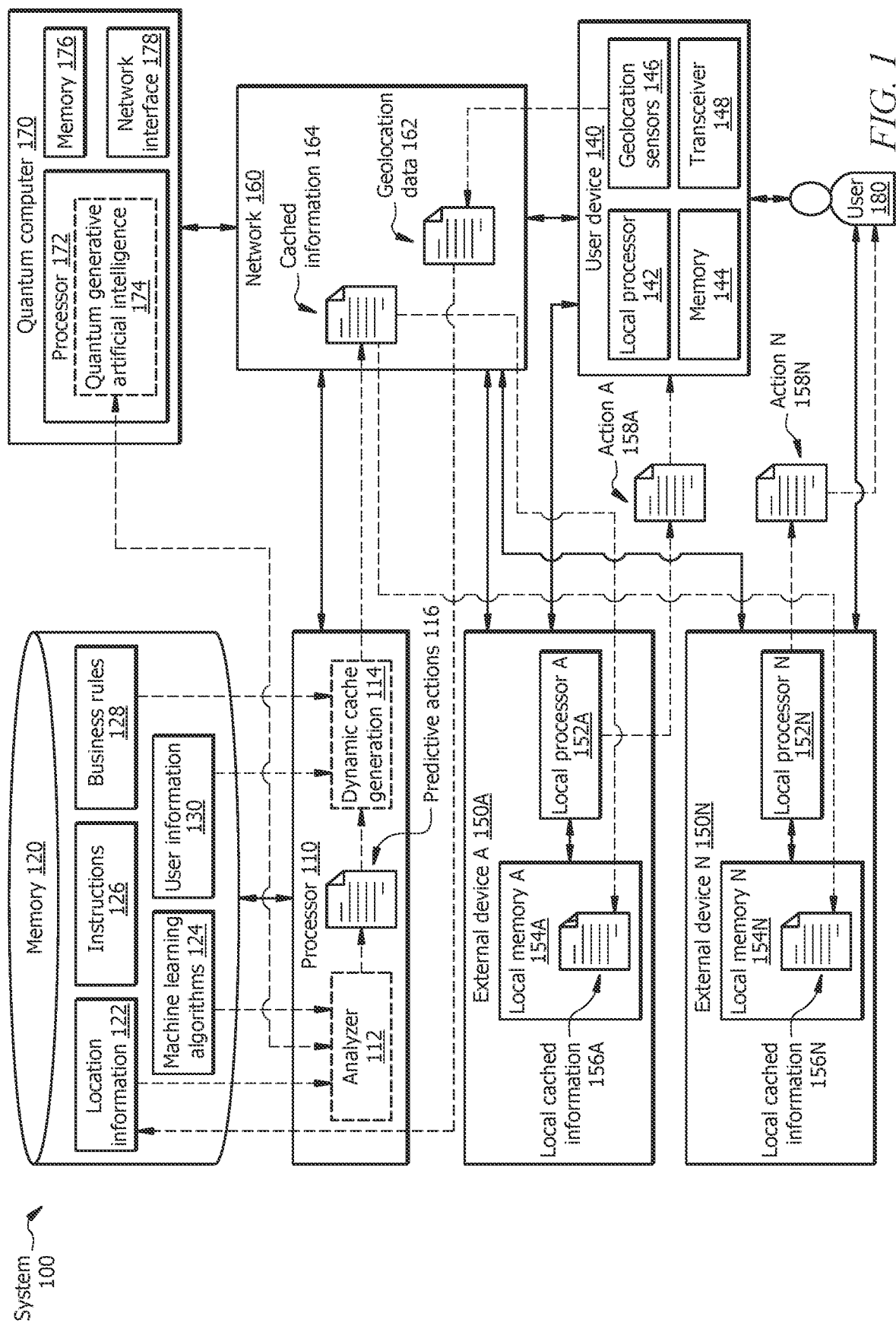
FIG. 1 illustrates one embodiment of a system configured to cache information dynamically.

FIG. 1 is a schematic diagram of a system 100 configured to cache information 156A-156N on an external device 150A-150N for use in performing one or more actions 158A-158N with either a user device 140 or the user 180 directly. Geolocation data 162 is collected from the user device 140 and forwarded through a network 160 to the processor 110. The processor 110, either alone or in combination with a quantum computer 170, is configured to analyze the geolocation data 162 and generate cached information 164 to be sent through the network 160 to the external devices 150A-150N. The external devices 150A-150N may then use the cached information 164 stored as local cached information 156A-156N to perform an action 158A-158N with the user device 140 and/or user 180.

In one embodiment, the system 100 comprises a processor 110 and a memory 120 that are in signal communication through a network 160 with a user device 140 and two or more external devices 150A-150N. In one embodiment, system 100 is also in signal communication with a quantum computer 170 configured to perform a quantum generative artificial intelligence operation 174. The system 100 may be configured as shown or in any other suitable configuration.

User Device

The user device 140 may be any device that a user 180 may use when performing actions 158A-158N and other unrelated activities. Examples of a user device 140 may include but are not limited to, computers, laptops, mobile devices (e.g., smartphones or tablets), servers, clients, or any other suitable type of devices that may be used to initiate and complete the one or more actions 158A-158N with an external device, e.g., 150A and/or interact with a user 180. The user device 140 includes at least one local processor 142 that performs one or more processes or operations, including but not limited to actions 158A-158N and the communication of geolocation data 162 through the network 160 to the processor 110.

The user device 140 may also include a memory 144. The memory 144 is provided for storing instructions for performance by the local processor 142. In one or more embodiments, the memory 144 may also store historical geolocation data 162, account data, preference data, and any other data that might be needed for performing an action, e.g., 158. The local memory 144 may store additional data and instructions related to the operations of the user device 140 and is not limited to the above-described instructions and data. While FIG. 1 shows the user device 140 includes a single local processor 142 and a single memory 144, it may include any suitable number and combination of local processors, e.g., 142, and memories, e.g., 144 as well as any other necessary components; with only one local processor, e.g., 144 and one local memory, e.g., 144 is shown in FIG. 1 for simplicity.

The user device also may include one or more geolocation sensors 146. The geolocation sensors 146 may include a global positioning satellite (GPS) receiver or similar device. Other geolocation sensors, such as inertial sensors, may be used alternatively or in addition to the GPS receiver to determine the device's location. Further, the user device 140 may use signals received by a transceiver 148 to determine the device's location through triangulation or other methods.

A transceiver 148 is provided in the user device 140 to communicate with the network 160 and/or the external devices 150A-150N. The transceiver 148 may comprise separate receivers and transmitters or may be one unitary device. The transceiver 148 may allow for wireless communications such as, but not limited to, 3G, 4G, WIFI, Bluetooth, and other wireless communication techniques. The transceiver 148 may, additionally or alternatively, utilize wired or optical communication mediums to communicate with the network 160. The disclosure is not limited to a specific type of communication or communication medium.

The user device 140 is configured to interact with the user 180 and to perform one or more actions 158A-158N. Some exemplary actions 158A-158N are processing a payment, processing a credit card or debit card, ordering a product, obtaining or providing a service, dispensing a product, allowing access to a resource such as, but not limited to, an internet page, secure documents, and/or other actions and/or resources. The user device also provides geolocation data 162 to processor 110 for producing cached information 164, as will be described below and later with regards to the method described in FIGS. 2A and 2B. As a non-limiting example, the user device 140 may be a smartphone configured to perform one or more transactions with an external device 150A, such as, but not limited to, another smartphone, terminal, or other computational device. Other actions 158A-158N, external devices 150A-150N, and user devices 140 may be used without departing from the disclosure.

Data shared between the user device 140, the network 160, the external devices 150A-150N, and the processor 110, such as the geolocation data 162 and any data related to the actions 158A-158N, may be encrypted. The encryption may use homomorphic encryption to ensure that the geolocation data 162 and/or action data, e.g., 158A, is not intercepted or altered. This is to prevent unauthorized access to sensitive geolocation data 162 as well as any information in the cached information 164 that a user may not want someone else to have access to, such as, but not limited to, account numbers, financial information, rewards information, personal records, device history, Internet history, or any other information.

External Devices

Examples of the external devices 150A-150N include, but are not limited to, computers, laptops, portable personal devices, mobile devices (e.g., smartphones or tablets), servers, clients, automated teller machines (ATM), point of sale devices (POS), or any other suitable type of devices that may be used to initiate and complete one or more actions 158A-158N. In one or more embodiments, at least one of the external devices 150A-150N may be an edge server that provides data either to the user device 140 or to one or more other external devices 150A-150N. The external devices 150A-150N each include at least one local processor 152A-152N that performs one or more processes or operations, including but not limited to the one or more actions 158A-158N and receiving and storing local cached information 156A-156N from the network 160 to the local memory 154A-154N. The local memory 154A-154N stores the local cached information 156A-156N and any other information such as, but not limited to, instructions for operating the external device 150A-150N.

While FIG. 1 shows the external devices 150A-150N, each including a single local processor 152A and 152N and a single local memory 154A and 154N, they may include any suitable number and combination of local processors 152A and 152N and local memories 154A and 154N as well as any other necessary components; with only one local processor e.g., 152A and one local memory e.g., 154A is shown in FIG. 1 for simplicity.

The external devices 150A-150N may interact directly with a user device 140 and/or the user 180 to perform the one or more actions 158A-158N. For example, a user device 140 may connect to an external device 150A through a Bluetooth® or near-field communication (NFC) connection. Alternatively, the external devices 150A-150N may communicate with a user device 140 using a network 160. During this connection, the external device 150A and user device 140 may exchange information to perform one or more actions 158A-158N. These actions 158A-158N may be performed at different times at the same location or at different locations. These actions are facilitated by the cached information stored as local cached information, e.g., 156A, in the local memory, e.g., 154A.

The local cached information 156A-156N is information that the external devices 150A-150N need to perform actions 158A-158N. This local cached information 156A-156N is derived from the cached information 164 sent from the processor 110 through the network 160 to the external device 150A-150N. The local cached information 156A-156N may include account numbers, incentives, rewards, authorizations to perform one or more actions 158A-158N, and/or any other information needed for performing an action 158A-158N. As described above, the local cached information 156A-156N is dynamically generated based on the user device's 140 current geolocation or a predicted geolocation and other factors or preferences included in the business rules 128 and user information 130.

Network

The network 160 may be any suitable type of wireless and/or wired network including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network 160 may be configured to support any suitable type of communication protocol as would be appreciated by one of ordinary skill in the art.

The network 160 may comprise any suitable components for facilitating communications between user device 140, the processor 110, the external devices 150A-150N, and, in some embodiments, a quantum computer 170. The network 160 may include routers, switches, gateways, fiber optics, cables, transmitters, and/or receivers needed for facilitating communication. The network may consist of one or more computational devices that form relays or perform computations outside this disclosure's scope. The network 160 relays geolocation data 162 obtained from the user device 140 to the processor, receives cached information 164 from the processor, and relays it to one or more external devices 150A-150N.

Memory

Memory 120 may be any type of storage for storing a computer program comprising instructions 126, location information 122, machine learning algorithms 124, business rules 128, and user information 130. The memory 120 may be a non-transitory computer-readable medium that is in operative communication with the processor 110. The memory 120 may be one or more disks, tape drives, or solid-state drives. Alternatively, or in addition, the memory 120 may be one or more cloud storage devices. The memory 120 may also be used as an over-flow data storage device to store applications when such applications are selected for execution and to store instructions 126 and data that are read during the execution of the applications. The memory 120 may be volatile or non-volatile. It may comprise read-only memory (ROM), random-access memory (RAM), ternary content-addressable memory (TCAM), dynamic random-access memory (DRAM), and static random-access memory (SRAM).

Memory 120 stores instructions 126 that, when executed by the processor 110, causes the processor 110 to perform the operations described in FIGS. 1 and 2. The instructions 126 may comprise any suitable set of instructions, logic, rules, or code. The memory 120 may also include storage that takes the form of a database or other storage arrangements for storing one or more of the location information 122, business rules 128, and user information 130, and these may be stored and recalled using known protocols such as SQL, XML, and/or any other protocol or language that a user, administrator, or developer of the system 100 wishes to use.

The memory stores the location information 122, which is used by the processor 110 for performing the analyzer operation 112, as will be described below, and with regards to the method shown in FIGS. 2A and 2B. In one or more embodiments, the location information 122 includes a plurality of geolocation data 162 received from the user device 140. This geolocation data 162 is stored in the memory as location information 122 and is stored along with a time stamp. Geolocation data 162 may be stored as location information 122 periodically after a predetermined period. For example, geolocation data 162 may be stored every minute, every thirty minutes, or any other predetermined period. Alternatively, the geolocation data 162 may be stored continuously or as often as the user device 140 is able to provide it. The location information 122 may be periodically purged, either due to storage space limitations or it may be periodically purged to meet business or regulatory requirements for retention of user 180 data. The location information 122 may also be stored in an encrypted form to prevent unauthorized access to the data.

Memory 120 also stores business rules 128. Business rules 128 may be specific to the organization that hosts system 100 or may be based on regulatory requirements, organizational rules, and business rules of the operators of the external devices 150A-150N. Business rules 128 may include such things as when a user 180 is allowed to perform specific actions 158A-158N and how much they are authorized to spend at a particular location or on a specific action 158A-158N. They may also include a user's permissions, the user information 130 that the user 180 has authorized to be collected, and the geolocation data 162.

Memory 120 in one or more embodiments stores user information 130 and location information 122 for use by processor 110 when performing the dynamic cache generation operation 114. The user 180 or an administrator may enter the user information 130 or may be generated by the processor 110 when performing analyzer operations 112 or other operations. The user information 130, similar to the location information 122, may be encrypted. The user information 130 may include user preferences, account numbers, earned rewards, and previous actions 158A-158N performed by the user 180 or their user device 140. The user preferences stored in the user information 130 may include such information as a preferred shop, restaurant, or type of shop or restaurant that the user 180 frequents. For example, in a non-limiting example, user information 130 may indicate that a particular user, e.g., 180, prefers fast food restaurants or more upscale restaurants. In another example, user information 130 may indicate that user 180 has a gym membership at a particular gym. The user information 130 may include more or different types of information than described herein. The above example is merely exemplary, and they do not limit the disclosure.

In one or more embodiments, the memory 120 stores machine learning algorithms 124. These machine learning algorithms 124, as will be described below, may be used during the analyzer operation 112 and/or dynamic cache generation operation 114 of the processor 110. The machine learning algorithms 124 may take any form, including natural language processing (NLP), machine perception, deep learning, a deep neural network, and generative artificial intelligence (AI). Alternatively, or in addition, the machine learning algorithms 124 may be hosted and/or performed as part of a quantum computer 170.

Quantum Computer

A quantum computer 170 may be provided in one or more embodiments, which comprises a quantum processor 172 that performs a quantum generative artificial intelligence operation 174. The quantum generative artificial intelligence operation 174 may be used alternatively or in addition to the machine learning algorithms 124 to perform the analyzer operation 112 and/or the dynamic cache generator operation 114. The quantum computer 170 may be utilized to perform more or less operations than that shown in FIG. 1 and is not limited to performing a quantum generative artificial intelligence operation 174.

The quantum computer 170 comprises a quantum processor 172 in signal communication with a memory 176 and a network interface 178. The quantum processor 172 may include one or more quantum processors operably coupled to the memory 176. The quantum processor 172 may comprise a superconducting quantum device (with qubits implemented by states of Josephson junctions), a trapped ion device (with qubits implemented by internal states of trapped ions), a trapped neutral atom device (with qubits implemented by internal states of trapped neutral atoms), a photon-based device (with qubits implemented by modes of photons), or any other suitable device that implements qubits with states of a respective quantum system.

Network interface 178 is configured to enable wired and/or wireless communications (e.g., via network 160). The network interface 178 is configured to communicate data between the quantum computer 170 and other components of the system 100. For example, the network interface 178 may comprise a WIFI interface, a local area network (LAN)

interface, a wide area network (WAN) interface, a modem, a switch, or a router. The quantum processor 172 is configured to send and receive data using the network interface 178. The network interface 178 may be configured to use any suitable type of communication protocol as would be appreciated by one of ordinary skill in the art.

Memory 176 may be volatile or non-volatile and may comprise read-only memory (ROM), random-access memory (RAM), ternary content-addressable memory (TCAM), dynamic random-access memory (DRAM), and static random-access memory (SRAM). Memory 176 may be implemented using one or more disks, tape drives, solid-state drives, and/or the like. The memory 176 is operable to store software instructions for performing a quantum generative artificial intelligence operation 174 and/or any other data and instructions.

In certain embodiments, the quantum computer 170 is configured to receive the location information 122 from the processor 110, performing the analyzer operation 112. The quantum computer 170 may then use a quantum generative artificial intelligence operation 174 to analyze the location information 122 and other information stored in the user information in memory 120. Such information may include IP address, previous behavior, or preferences. In certain embodiments, before performing the analysis with the quantum generative artificial intelligence operation 174, the quantum computer 170 may generate a quantum state based on the location information 122 and other information.

Based on this analysis, the quantum generative artificial intelligence operation 174 may determine what types of information should be generated by the dynamic cache generation operation 114 of the processor 110. The quantum computer 170 performing the quantum generative artificial intelligence operation 174 may also consider the time of day and the user's proximity to specific environments. For example, in a non-limiting example, if a user is known to purchase food at a particular time, and the user is in the vicinity of one or more restaurants, the quantum generative artificial intelligence operation 174 may determine that the processor 110 performing the dynamic cache generation operation 114 should generate cached information 164 related to the one or more restaurants. As another non-limiting example, the quantum generative artificial intelligence operation 174 may have a different output if the user is on a college campus versus near a hospital.

The quantum computer 170, when receiving location information 122 and other information, may generate one or more results that attempt to predict the actions 158A-158N that a user 180 may request and/or perform in the near future. The dynamic cache generation operation 114 of the processor 110 may then use these results to produce the cached information 164 sent to the external devices 150A-150N. The quantum computer 170 may be configured to communicate only the highest-ranked results or results with a rank higher than a predetermined threshold to the processor 110. For example, in a non-limiting example, only the top five results may be communicated or only results with a probability greater than fifty percent. Any number of results and/or probability may be used without departing from the disclosure.

Processor

The processor 110 receives from the user device 140 through the network 160 geolocation data 162 and provides cached information 164 to the external devices 150A-150N. The processor 110 causes the geolocation data to be stored as part of location information 122 in memory 120. As described above, this location information 122 contains geolocation information from a period, along with timestamps, that may be used by machine learning algorithms 124 and/or the quantum generative artificial intelligence operation 174 to determine probable future locations and needs for facilitating actions 158A-158N using cached information 164. The processor 110, when performing an analyzer operation 112, retrieves this location information 122 and, using a machine learning algorithm 124 and/or quantum generative artificial intelligence operation 174, determines what information a dynamic cache generator operation 114 should provide as the cached information 164 to the external devices 150A-150N. The dynamic cache generator operation 114 uses user information and/or business rules 128 to determine what information the cached information 164 should include.

The processor 110 may take the form of any electronic circuitry including, but not limited to, state machines, one or more central processing unit (CPU) chips, logic units, cores (e.g., a multi-core processor), field-programmable gate array (FPGAs), application specific integrated circuits (ASICs), or digital signal processors (DSPs). The processor 110 may be a programmable logic device, a microcontroller, a microprocessor, or any suitable combination of the preceding. The processor 110 is communicatively coupled to and in signal communication with the memory 120. The one or more processors making up the processor 110 are configured to process data and may be implemented in hardware or software. For example, processor 110 may be 8-bit, 16-bit, 32-bit, 64-bit, or any other suitable architecture. The processor 110 may include an arithmetic logic unit (ALU) for performing arithmetic and logic operations, processor registers that supply operands to the ALU and store the results of ALU operations, and a control unit that fetches instructions 126 from memory 120 and executes them by directing the coordinated operations of the ALU, registers and other components.

The processor 110 is in operative communication with the memory 120. The processor 110 is configured to implement various instructions 126 stored in the memory 120. The processor 110 may be a special-purpose computer designed to implement the instructions 126 and/or functions disclosed herein. For example, the processor 110 may be configured to perform the operations of the methods described in FIGS. 2A and 2B.

While a single processor 110 is shown, the processor 110 may include a plurality of processors or computational devices. The analyzer operation 112, dynamic cache generator operation 114, and/or other operations described herein as being performed by processor 110 may be performed by a separate processor or software application executed on a single computational device, e.g., processor 110, or they may be located on different servers and/or even separate datacenters such as a cloud server and/or the external devices 150A-150N, quantum computer 170, and user device 140.

Initially, the processor 110 receives geolocation data 162, and any other user information 130 that an administrator or other concerned party determines is needed for performing the analyzer operation 112 and/or dynamic cache generation operation 114. The geolocation data 162 is stored as location information 122 in the memory. Similar user information 130 is also stored in the memory. The processor 110 periodically or continuously performs the analyzer operation 112 to determine one or more actions 158A-158N that a user 180 or the user's device 140 may request to perform with the external devices 150A-150N.

The processor 110, when performing the analyzer operation 112, retrieves the location information. Utilizing one or more machine learning algorithms 124 or the quantum generative artificial intelligence operation 174, the processor 110 and/or the quantum computer 170 determines predictive actions 116 likely to be performed. The predictive actions 116 may be associated with a probability or rank assigned during the analyzer operation 112 by the processor 110 and/or quantum computer 170.

The processor 110 then utilizes the predictive actions 116, along with the user information 130 and business rules 128 stored in the memory 120 to perform the dynamic cache generation operation 114. When performing the dynamic cache generation operation 114, the processor 110 may use all the predictive actions 116 or only a portion. In one embodiment, a portion of the predictive actions 116 are chosen for use in performing the dynamic cache generation operation 114 based on a predetermined threshold. The predetermined threshold may be, for example, the top five or ten predictive actions 116 or those predictive actions 116 that have a probability more significant than a predetermined amount, such as fifty percent or ninety percent.

The processor 110 performs the dynamic cache generation operation 114 utilizing the portion or all of the predictive actions 116 to generate cached information 164 needed for performing actions 158A-158N that correspond to the predictive actions 116. The processor 110 determines what user information and other information obtained from the business rules 128 and/or additional stored information stored in the memory 120 is needed for each of the predictive actions to be performed by the external device 150A-150N. Such information may include account numbers, membership numbers, IP addresses, rewards programs, balances, personal records, account balances, preferred websites, preferred vendors, and/or other information needed to perform one or more actions 158A-158N that correspond to the predictive actions 116.

The processor 110, performing the dynamic cache generation operation 114, generates cached information 164 that is then sent to the appropriate external device 150a-150N over the network 160. Each External device 150A-150N receives cached information 164 specific to that External device, e.g., 150A, and the actions, e.g., 158A, that might be performed by one particular external device, e.g., 150A. The cached information 164 needed by a first external device, e.g., 150A, may differ from that required by a second external device, e.g., 150N.

For example, in a non-limiting example, if processor 110 predicts that a user 180, based on their geolocation data 162 and time of day, may purchase food at a store associated with a first external device 150A, the processor 110 may provide in the cached information 164 sent to the first external device 150A an authorization for a purchase of food at the store along with account numbers and any rewards programs. If processor 110 also, or instead, predicts that user 180 may ride in a vehicle associated with the external device 150N, the processor 110 may provide cached information 164 to a second or additional external device 150N that includes a pre-purchased ticket or other information needed for providing the ride in a vehicle associated with external device 150N. Other actions 158A-158N may be predicted and performed by any type of external devices 150A-150N, and the disclosure is not limited to those described above.

Providing Caching Information Process

Figure 2A:
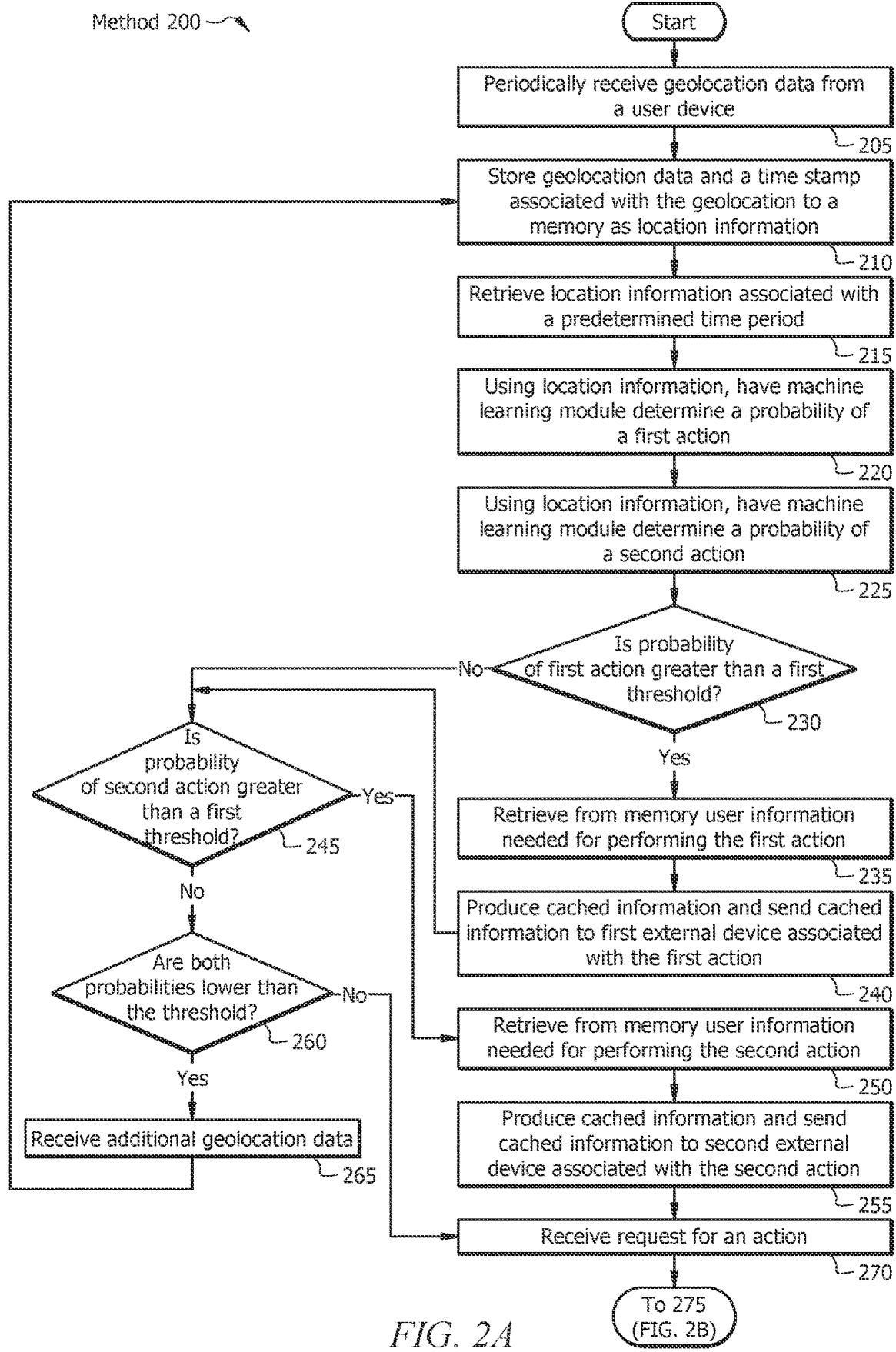
FIGS. 2A and 2B illustrate one embodiment of a flowchart for caching information dynamically.
Figure 2B:
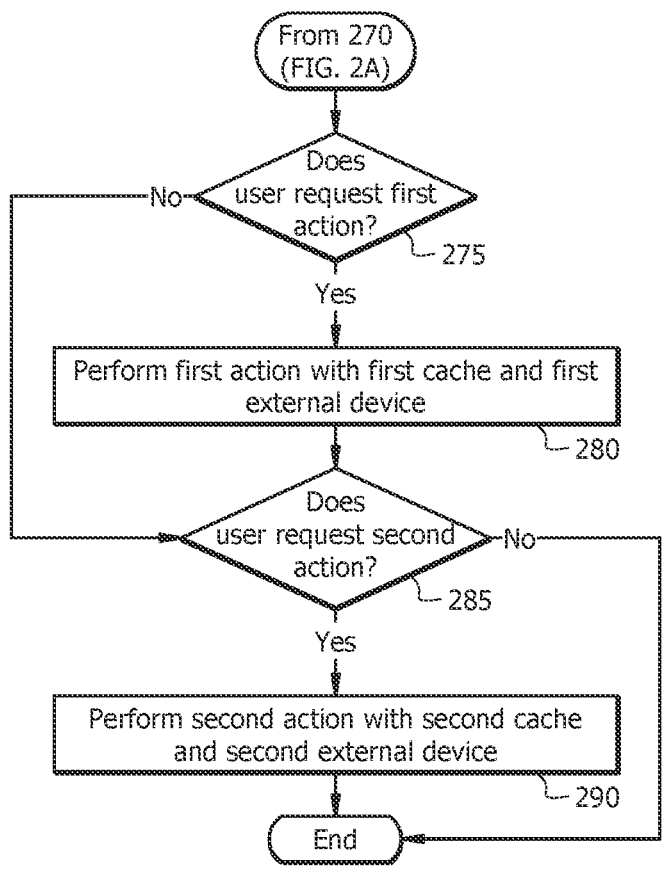

FIGS. 2A and 2B are a flowchart of an embodiment of method 200 for dynamically caching information by a processor 110 based on geolocation data 162 of a user device 140. The processor 110 may execute instructions 126 stored in the memory 120, which employ the method 200 to provide cached information 164 to an external device 150A-150N based on geolocation data 162 received from a user device 140.

As shown in FIG. 2A, method 200 begins with operation 205. At operation 205, processor 110 receives geolocation data 162 from a user device 140. The geolocation data 162 may be generated by the geolocation sensors 146 of the user device 140. The geolocation data 162 may be generated and sent through the network 160 to the processor 110 periodically, for example, every thirty seconds, minute, hour, or other period. Once the geolocation data 162 is received in operation 205, method 200 proceeds to operation 210. In operation 210, the processor 110 stores the geolocation data 162 and a timestamp in memory 120 as location information 122. Once the geolocation data 162 is received in operation 205 and stored in operation 210, method 200 proceeds to operation 215.

After a predetermined period, in operation 215, the processor 110 retrieves the location information 122 from memory 120. Only the location information 122 associated with a predetermined time period is retrieved in one or more embodiments. For example, in a non-limiting example, processor 110 may cause location information 122 for the past hour or the past day to be retrieved. Once this location information 122 is retrieved by processor 110 from memory 120, the processor begins to perform the analyzer operation 112 to analyze the location information 122 in operation 220.

In operation 220, the location information 122 retrieved from memory 120 is analyzed by the processor 110, performing the analyzer operation 112. This operation may use machine learning to determine the probability that a first action, e.g., 158A, may be performed. The machine learning, as described above, may be one or more machine learning algorithms 124 stored in the memory 120 and performed by the processor 110. Alternatively, or additionally, the machine learning may be performed by a quantum computer 170 using a quantum generative artificial intelligence operation 174. Similarly, in operation 225, the probability of a second action, e.g., 158N, is also determined. Operations 220 and 225 may be performed simultaneously or in sequential order.

In one or more embodiments, only two actions, e.g., 158A and, e.g., 158N, may be determined by the processor 110 or quantum computer 170 in operations 220 and 225. Alternatively, more than two actions 158A-158N may be determined, with the first action, e.g., 158A, and the second action, e.g., 158N, being the most probable or having the highest ranking. Other methods of selecting and/or determining a first and/or second action may be used. Alternatively, the first action, e.g., 158A, and the second action, e.g., 158N, may be selected based on other criteria besides rank or probability, and the disclosure is not limited to those criteria.

Once at least the first action, e.g., 158A, and second action, e.g., 158N, are determined by the processor 110 performing the analyzer operation 112, and the processor 110 determines a probability or ranking for each in operations 220 and 225, method 200 proceeds to operation 230. In operation 230, the processor 110 determines if the probability of the first action, e.g., 158A, is greater than a first threshold. The first threshold may be based on the specifics of the first action, e.g., 158A or other criteria. Alternatively, in operation 230, a user, administrator, or other concerned party may determine a first threshold based on business rules 128 or other criteria. If it is determined in operation 230 that the probability of the first action, e.g., 158A, is greater than the first threshold, method 200 may then proceed to operation 235.

In operation 235, the processor 110 retrieves user information 130 and any pertinent information in the business rules or location information 122 from memory 120. This information is used by processor 110 to generate cached information 164 by performing the dynamic cache generation operation 114. The cached information 164 may be any information needed to perform or authorize action 158A. Such information may be account information, authorization information, rewards information, permissions, websites, network data, application data, and/or any other data needed to perform an action 158A with or without using other external devices 150A-150N. Once the user information 130 is retrieved and the processor 110 produces the cached information 164 by the dynamic cache generation operation 114, the cached information 164 is sent to the external device 150A associated with the first action, e.g., 150A in operation 240.

For example, based on a user device's 140 geolocation data 162, it may be determined that it is probable that a user 180 will enter a grocery store. Based on that action having a probability greater than a threshold in operation 230, processor 110 will retrieve, in operation 235, account information for purchasing groceries; it may also retrieve pre-authorization so that user 180 may purchase groceries up to a specific value without the need for waiting for authorization from a backend system (not shown). The processor 110 may also determine that business rules 128 indicate that rewards or pre-determined coupons should also be included in the cached information 164.

Returning to operation 240, once the cached information 164 is sent by the processor 110 through the network 160 to the external device 150A, method 200 returns to operation 245. Alternatively, if in operation 230 it is determined by the processor 110 that the first action, e.g., 158A, does not have a probability greater than a first threshold, method 200 proceeds from operation 230 directly to operation 245 without performing operations 235 and 240.

In operation 245, similar to operation 230, processor 110 determines if the probability of a second action, e.g., 158N, is greater than the first threshold. If processor 110 determines that the probability is greater than the first action, method 200 proceeds to operation 250. In operation 250, similar to operation 235, the processor retrieves from memory 120 user information 130 as well as appropriate business rules 128 related to the second action, e.g., 158N. Once processor 110 retrieves this information, method 200 proceeds to operation 255, where processor 110 performs the dynamic cache generation operation 114 and produces the cached information 164 associated with the second action, e.g., 158N. The processor 110 then sends the cached information 164 through the network 160 to the second external device 150N.

If the probability of the second action is less than the first threshold in operation 245, then the method proceeds to operation 260. In operation 260, the processor 110 determines if the probabilities for both the first action, e.g., 158A, and the second action, e.g., 158N, are lower than the first threshold. If they are both lower than the first threshold, method 200 proceeds to operation 265, and processor 110 continues to receive additional geolocation information and repeats operations 210-265 until at least one of the actions 158A-158N has a probability greater than the first threshold.

If the processor 110 in operation 230, 245, and/or 260 determines that at least one of the actions 158A-158N has a probability greater than the first threshold, the method 200 proceeds to operation 270. In operation 270, the processor 110 receives a request from the user 180 to perform an action, e.g., 158A. This action, e.g., 158A, may be an action, e.g., 158A, that comprises the user 180 having the user device 140 connected to one of the external devices, e.g., 150A to perform an action, e.g., 158A, or it may be an action, e.g., 158N that the user 180 performs directly with an external device 150A-150N without the user device 140.

As shown in FIG. 2B, method 200 continues with operation 275. In operation 275, the processor 110 or alternatively one or more external devices 150A-150N determines if the user requested the first action, e.g., 158A. If the user requests the first action, e.g., 158A, the method proceeds to operation 280. Otherwise, the operation proceeds to operation 285. In operation 280, the first action, e.g., 158A, is performed by the external device, e.g., 150A, associated with the first action, e.g., 158A, using the cached information 164 received from the processor 110 in operation 240. Once operation 280 is completed, the method 200 proceeds to operation 285.

Operation 285 begins either when the processor 110 determines that the user does not request a first action, e.g., 158A, in operation 265, or after the first action, e.g., 158A, is performed in operation 280. In operation 285, the processor 110 and/or the external devices 150A-150N determine if the user 180 requested the second action, e.g., 158N, to be performed. If yes, the method process to operation 285 and the second action, e.g., 158N, is performed with the external device, e.g., 150N associated with the second action, e.g., 158N. Once processor 110 determines that the user did not request the second action, e.g., 158N, or the second action, e.g., 158N, is performed in operation 290, method 200 of FIGS. 2A and 2B ends.

While external device 150A has been described as being associated with the first action 158A and external device 150N associated with the second action 158N, a single external device, e.g., 150A, may be associated with both the first Action, e.g., 158A and, e.g., 158N or associated with a different action then that described above. Any combination of external devices 150A-150N and actions 158A-158N may be used without departing from the disclosure.

While several embodiments have been provided in the present disclosure, it should be understood that the disclosed systems and methods might be embodied in many other specific forms without departing from the spirit or scope of the present disclosure. The present examples are to be considered illustrative and not restrictive, and the intention is not to be limited to the details given herein. For example, the various elements or components may be combined or integrated into another system, or certain features may be omitted or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 140 (f) as it exists on the date of filing hereof unless the words "means for" or "operation for" are explicitly used in the particular claim.

The invention claimed is:

1. A system for dynamically caching information, the system comprising:
   a memory configured to store location information and user information; and
   a processor operably coupled to the memory and configured to:
      receive, periodically, geolocation data associated with a first external device;
      store the received geolocation data with a time stamp to the location information in the memory;
      retrieve, after a predetermined period of time from the memory, the location information corresponding to the predetermined time period;
      determine, using a machine learning operation based on the location information, a probability for a first action to be performed by a user of the first external device;
      retrieve from the memory, user information needed for performing the first action, when the probability of the first action being performed is greater than a predetermined amount;
      send the retrieved user information to a second external device to store as cached information; and
      perform the first action using the cached information.

2. The system of claim 1, wherein the machine learning operation uses quantum generative artificial intelligence.

3. The system of claim 1, wherein the user information comprises an account number and one or more of: rewards, incentives, limitations, or permissions.

4. The system of claim 1, wherein the second external device is an edge server.

5. The system of claim 1, wherein the second external device is a point-of-sale device.

6. The system of claim 1, wherein the machine learning operation determines the probability for the first action based on both location and time.

7. The system of claim 1, wherein the first external device is a user's portable personal device.

8. The system of claim 1, wherein the processor is further configured to:
   determine, using the machine learning operation a second probability for a second action to be performed by a user of the first external device;
   retrieve from the memory, second user information needed for performing the second action, when the probability of the second action being performed is greater than the predetermined amount; and
   send the retrieved second user information to a third external device to store as cached information.

9. The system of claim 8, wherein the second action and the first action are actions that are performed at different times at a same location.

10. The system of claim 8, wherein the second action and the first action are actions that are performed at different locations.

11. A method for dynamically caching information, comprising:
   receiving, periodically, geolocation data associated with a first external device;
   storing the received geolocation data with a time stamp to location information in a memory;
   retrieving, after a predetermined period of time from the memory, the location information corresponding to the predetermined time period;
   determining, using a machine learning operation based on the location information, a probability for a first action to be performed by a user of the first external device;
   retrieving from the memory, user information needed for performing the first action, when the probability of the first action being performed is greater than a predetermined amount;
   sending the retrieved user information to a second external device to store as cached information; and
   performing the first action using the cached information.

12. The method of claim 11, wherein the machine learning operation uses quantum generative artificial intelligence.

13. The method of claim 11, wherein the user information comprises an account number and one or more of: rewards, incentives, limitations, or permissions.

14. The method of claim 11, further comprising:
   determining, using the machine learning operation a second probability for a second action to be performed by a user of the first external device;
   retrieving from the memory, second user information needed for performing the second action, when the probability of the second action being performed is greater than the predetermined amount; and
   sending the retrieved second user information to a third external device to store as cached information.

15. The method of claim 14, wherein the second action and the first action are actions that are performed at different times at a same location.

16. The method of claim 14, wherein the second action and the first action are actions that are performed at different locations.

17. A non-transitory computer-readable medium storing instructions that when executed by a processor cause the processor to:
   receive, periodically, geolocation data associated with a first external device;
   store the received geolocation data with a time stamp as location information in a memory;
   retrieve, after a predetermined period of time from the memory, the location information corresponding to the predetermined time period;
   determine, using a machine learning operation based on the location information, a probability for a first action to be performed by a user of the first external device;
   retrieve from the memory, user information needed for performing the first action, when the probability of the first action being performed is greater than a predetermined amount;
   send the retrieved user information to a second external device to store as cached information; and
   perform the first action using the cached information.

18. The non-transitory computer-readable medium of claim 17, wherein the machine learning operation uses quantum generative artificial intelligence.

19. The non-transitory computer-readable medium of claim 17, wherein the user information comprises an account number and one or more of: rewards, incentives, limitations, or permissions.

20. The non-transitory computer-readable medium of claim 17, wherein the machine learning operation determines the probability for the first action based on both location and time.

* * * * *